(12) United States Patent  (10) Patent No.: US 8,474,414 B2
Dagnon  (45) Date of Patent: Jul. 2, 2013

(54) RETRACTABLE LEASH AND RESTRAINT ASSEMBLY

(76) Inventor: Brian Dagnon, Bellingham, WA (US)

( * ) Notice: Subject to any disclaimer, the term of this patent is extended or adjusted under 35 U.S.C. 154(b) by 119 days.

(21) Appl. No.: 13/011,920

(22) Filed: Jan. 23, 2011

(65) Prior Publication Data

US 2011/0174238 A1   Jul. 21, 2011

Related U.S. Application Data

(63) Continuation-in-part of application No. 12/769,139, filed on Apr. 28, 2010, now abandoned, which is a continuation of application No. 11/619,968, filed on Jan. 4, 2007, now abandoned.

(51) Int. Cl.
*A01K 27/00* (2006.01)
(52) U.S. Cl.
USPC .......................... 119/794; 119/856
(58) Field of Classification Search
USPC ....................... 119/792–794, 856
See application file for complete search history.

(56) References Cited

U.S. PATENT DOCUMENTS

| | | | |
|---|---|---|---|
| 887,072 A * | 5/1908 | Delaney | 119/794 |
| 2,799,245 A | 7/1957 | Ruggiero et al. | |
| 2,833,250 A | 5/1958 | Beebe | |
| 3,250,253 A | 5/1966 | Galin | |
| 4,202,510 A | 5/1980 | Stanish | |
| 4,328,766 A | 5/1982 | Deibert | |
| 4,328,767 A | 5/1982 | Peterson | |
| 4,501,230 A | 2/1985 | Talo | |
| 4,887,551 A | 12/1989 | Musetti | |
| 4,903,638 A | 2/1990 | Lacey | |
| 4,964,370 A * | 10/1990 | Peterson | 119/794 |
| RE34,351 E | 8/1993 | Lacey | |
| 5,233,942 A * | 8/1993 | Cooper et al. | 119/792 |
| 5,732,662 A | 3/1998 | Jacobsen | |
| 5,816,198 A | 10/1998 | Peterson | |
| 6,148,773 A | 11/2000 | Bogdahn | |
| 6,378,937 B1 | 4/2002 | Faudman | |
| 6,481,382 B2 | 11/2002 | Cohn | |
| 6,532,903 B2 | 3/2003 | Prusia et al. | |
| 6,581,547 B1 | 6/2003 | Austin | |
| 6,694,922 B2 | 2/2004 | Walter et al. | |
| 6,792,893 B1 | 9/2004 | Quintero et al. | |
| 6,925,967 B1 | 8/2005 | Woodruff | |
| 6,955,138 B2 | 10/2005 | DeBien | |
| 7,017,527 B2 | 3/2006 | Price | |
| 7,040,257 B2 | 5/2006 | Waxman et al. | |
| 7,073,462 B1 | 7/2006 | Layman | |
| 7,357,284 B2 | 4/2008 | Jauvin | |
| 2002/0046715 A1 * | 4/2002 | McCarville | 119/858 |
| 2002/0096128 A1 * | 7/2002 | Cohn | 119/793 |

(Continued)

*Primary Examiner* — Kimberly Berona
(74) *Attorney, Agent, or Firm* — Michael R. Schacht; Schacht Law Office, Inc.

(57) ABSTRACT

A restraint system for an animal comprising a collar assembly and a retractable leash assembly. The collar assembly comprises a strap member adapted to be secured around a portion of the animal and a pouch member secured to the strap member. The pouch member defines a pouch chamber and an open end. The retractable leash assembly comprises a retraction assembly secured to the strap member within the pouch chamber, a cord member operatively connected to the retraction assembly, and a handle member operatively connected to the cord member. The retractable leash assembly is operable in a retracted configuration in which the handle member is substantially within the pouch chamber. The retractable leash assembly is operable in an extended configuration in which the handle member is outside of the pouch chamber.

17 Claims, 3 Drawing Sheets

U.S. PATENT DOCUMENTS

| | | | |
|---|---|---|---|
| 2003/0106501 A1* | 6/2003 | Austin | 119/794 |
| 2004/0154556 A1* | 8/2004 | Masterson et al. | 119/794 |
| 2006/0137625 A1* | 6/2006 | Conte | 119/858 |
| 2006/0236955 A1* | 10/2006 | Lord | 119/794 |
| 2008/0072846 A1 | 3/2008 | Albright | |
| 2009/0294495 A1* | 12/2009 | Moreau et al. | 224/219 |
| 2011/0023794 A1* | 2/2011 | Smith | 119/794 |
| 2011/0308480 A1* | 12/2011 | San Sebastian Mendizabal | 119/794 |

* cited by examiner

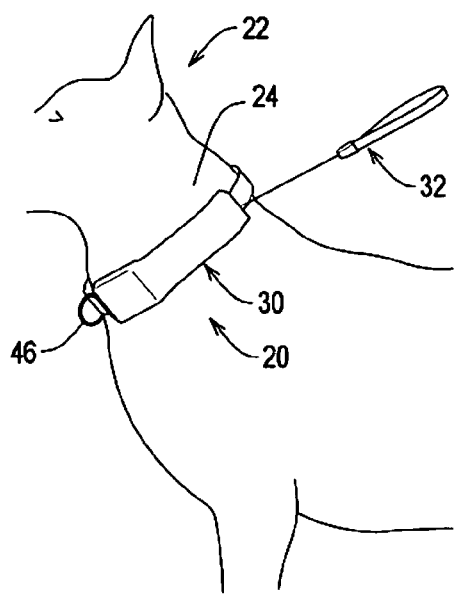
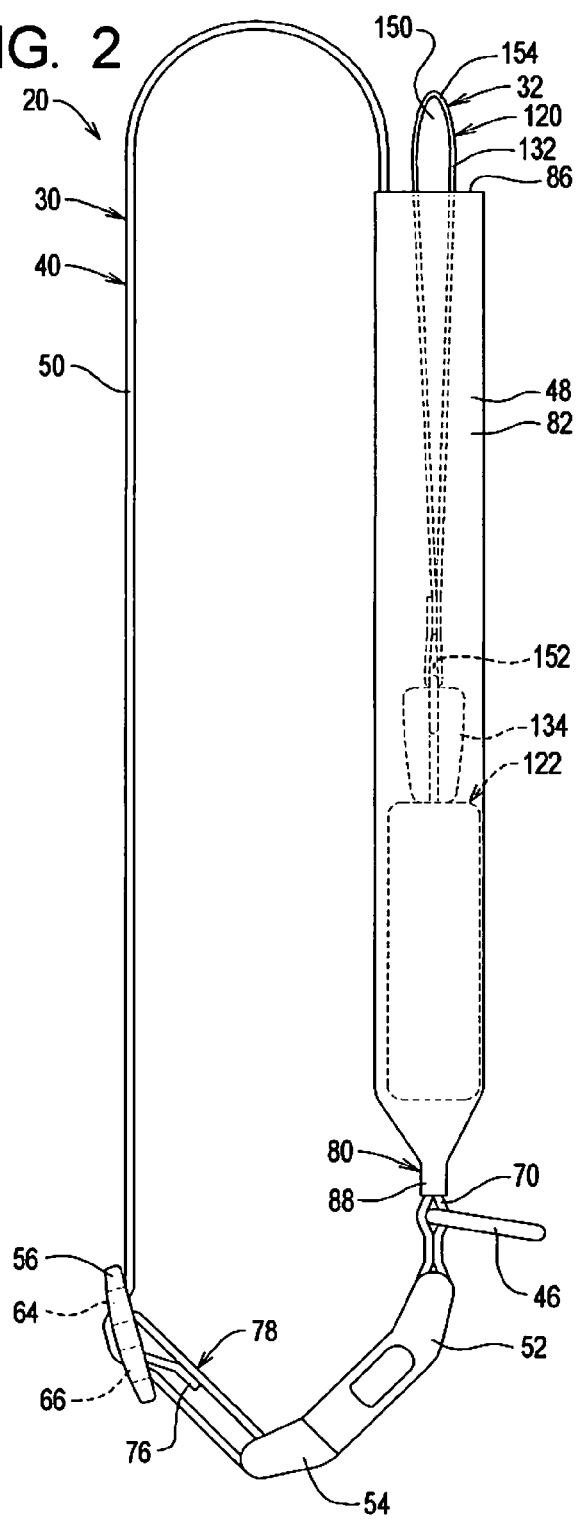

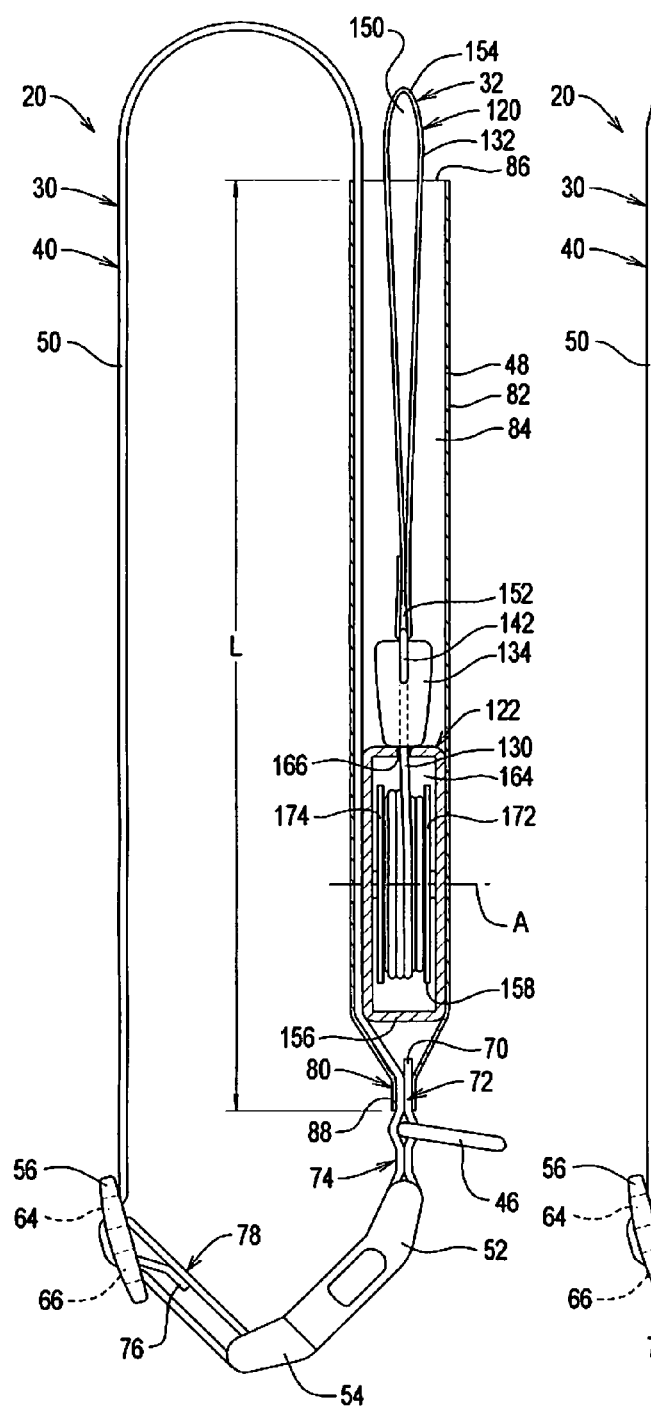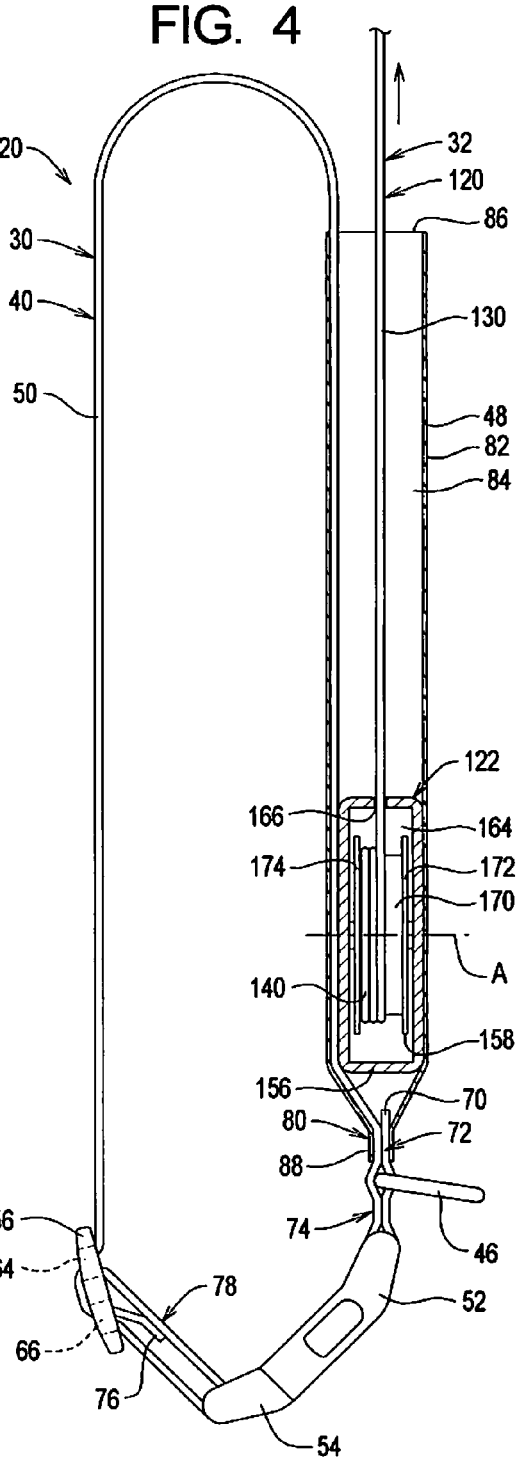

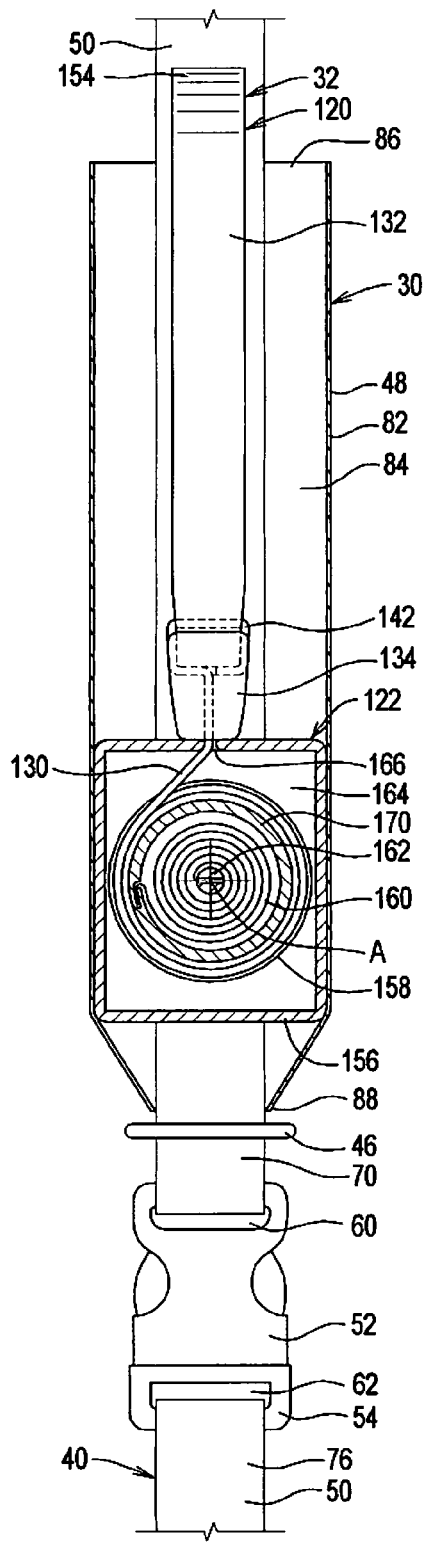
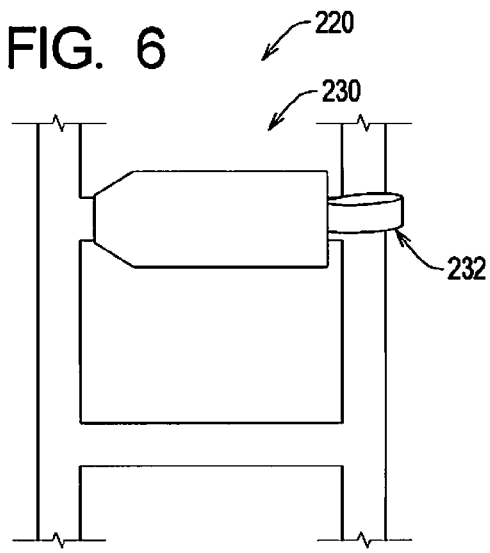
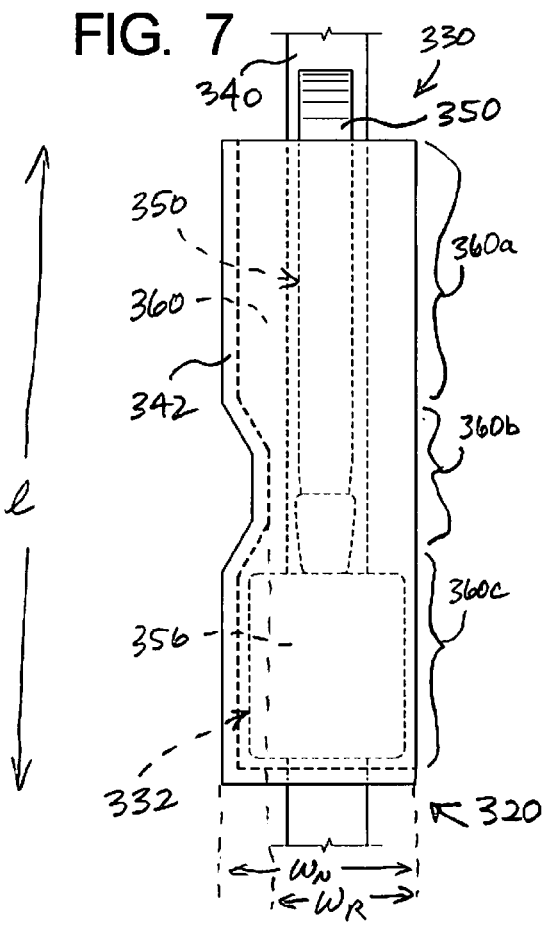
FIG. 5
FIG. 6
FIG. 7

RETRACTABLE LEASH AND RESTRAINT ASSEMBLY

RELATED APPLICATIONS

This application, U.S. patent application Ser. No. 13/011,920 filed Jan. 23, 2011 is a continuation-in-part of U.S. patent application Ser. No. 12/769,139 filed Apr. 28, 2010, now abandoned.

U.S. patent application Ser. No. 12/769,139 is a continuation of U.S. patent application Ser. No. 11/619,968 filed Jan. 4, 2007, now abandoned.

The contents of all related applications are incorporated herein by reference. The immediate prior application, Ser. No. 12/769,139, is attached hereto at Exhibit A.

BACKGROUND

The present invention relates generally to a retractable leash and animal restraint assembly. More particularly, the present invention relates to a retractable leash and collar assembly.

Conventional animal restraining assemblies comprise collars and separate, detachable leashes. Oftentimes these assemblies consist of multiple parts that must be assembled prior to use. This can become quite cumbersome when a user is attempting to walk his or her pet and must carry the additional parts, such as the leash, in case necessary. Particularly in cases where a user chooses to utilize such assemblies during exercise, any additional components may make the practice altogether distasteful.

Even where integrated restraining devices exist, these devices are traditionally uncomfortable for the animal and cumbersome for the user, as they traditionally comprise bulky, heavy components. For example, instead of a user needing to carry the additional apparatus, as described above, the animal is forced to bear the burden. Even where integrated assemblies exist, such devices traditionally lack the strength to fully restrain a large animal, as well as the flexibility to enable a user to easily extract and retract the leash from the restraining component. Further, traditionally even the integrated assemblies require separate pouches or components as part of the assembly, making manufacture of the device unnecessarily expensive.

A need therefore exists for a retractable leash and restraint assembly having a collar comprising a built-in leash that is not exposed to the elements, which minimizes excess equipment, is comfortable to the animal, is easy to use and to assemble, and that is strong enough to restrain even larger-weight animals.

SUMMARY

The present invention may be embodied as a restraint system for an animal comprising a collar assembly and a retractable leash assembly. The collar assembly comprises a strap member adapted to be secured around a portion of the animal and a pouch member secured to the strap member. The pouch member defines a pouch chamber and an open end. The retractable leash assembly comprises a retraction assembly secured to the strap member within the pouch chamber, a cord member operatively connected to the retraction assembly, and a handle member operatively connected to the cord member. The retractable leash assembly is operable in a retracted configuration in which the handle member is substantially within the pouch chamber. The retractable leash assembly is operable in an extended configuration in which the handle member is outside of the pouch chamber.

The present invention may also be embodied as a method of restraining an animal comprising the following steps. A strap member adapted to be secured around a portion of the animal is provided. A pouch member is secured to the strap member to form a collar assembly, where the pouch member defines a pouch chamber and an open end. A retraction assembly is secured to the strap member within the pouch chamber. A cord member is operatively connected to the retraction assembly. A handle member is operatively connected to the cord member. The cord member is retracted into the retraction assembly such that the handle member is substantially within the pouch chamber. The cord member is pulled from the retraction assembly such that the handle member is outside of the pouch chamber.

The present invention may also be embodied as a restraint system for an animal comprising a collar assembly and a retractable leash assembly. The collar assembly comprises a strap member adapted to be secured around a portion of the animal, a first buckle member secured relative to a first end of the strap member, an adjustment member secured relative to a second end of the strap member, a second buckle member supported by the strap member adjacent to the adjustment member, and a pouch member secured to the strap member, the pouch member defining a pouch chamber and an open end. The retractable leash assembly comprises a retraction housing secured to the strap member within the pouch chamber, a retraction member arranged within the housing, a cord member operatively connected to the retraction member, and a handle member operatively connected to the cord member. The retractable leash assembly is operable in a retracted configuration in which the handle member is substantially within the pouch chamber. The retractable leash assembly is operable in an extended configuration in which the handle member is outside of the pouch chamber.

BRIEF DESCRIPTION OF THE DRAWINGS

FIG. 1 is a perspective view of a first example restraint system of the present invention;

FIG. 2 is a side elevation view of the first example restraint system;

FIG. 3 is a side elevation, partial cut-away view of the first example restraint system showing a leash assembly thereof in its retracted position;

FIG. 4 is a side elevation, partial cut-away view of the first example restraint system showing the leash assembly thereof in its extended position;

FIG. 5 is a top elevation, partial cut-away view of the first example restraint system showing the leash assembly thereof in its retracted position;

FIG. 6 is a top plan view of a second example restraint system of the present invention; and FIG. 7 is a top plan view of a third example restraint system of the present invention.

DETAILED DESCRIPTION

Referring initially to FIG. 1 of the drawing, depicted at 20 therein is a first example restraint assembly 20 constructed in accordance with, and embodying, the principles of the present invention. The example restraint assembly 20 is intended for use on a pet such as a dog 22. In particular, the restraint assembly 20 is adapted to be supported by a neck 24 of the dog 22.

The example restraint assembly 20 comprises a collar assembly 30 and a leash assembly 32. As shown in FIG. 1, the collar assembly 30 is adapted to be detachably attached around the neck 24 of the dog 22. The example leash assembly 32 is supported by the collar assembly 30 and is reconfigurable between retracted (FIG. 3) and extended (FIG. 4) configurations.

FIG. 2 illustrates that the collar assembly 30 comprises a strap assembly 40, a ring member 46, and a pouch member 48.

The example strap assembly 40 comprises a strap member 50, a first buckle member 52, a second buckle member 54, and an adjustment member 56. The strap member 50 may be a conventional webbing material made of a material such as nylon. The first and second buckle members 52 and 54 are detachably attachable to each other to allow ends of the collar assembly to be detachably attached to each other and may be conventional. The adjustment member 56 allows an effective length of the collar assembly 30 to be adjusted and may also be conventional. The strap member 50, first and second buckle members 52 and 54, and adjustment member 56 should all be of a weight and strength sufficient as necessary for a particular size and temperament of dog.

As perhaps best shown in FIG. 5, the example first buckle member 52 defines a first buckle opening 60, and the example second buckle member 54 defines a second buckle opening 62. The example adjustment member 56 defines first and second adjustment openings 64 and 66.

A first end 70 of the strap member 50 is passed through the first buckle opening 60 and attached to first and second intermediate locations 72 and 74 along the strap member 60. When the first end of the strap member 70 is attached to the first and second intermediate locations 72 and 74, the first buckle member 52 is supported in a predetermined relationship relative to the first end 70 of the strap member 50.

The ring member 46 is arranged between the first and second intermediate locations 72 and 74 when the first end 70 is attached to these locations 72 and 74. Accordingly, the ring member 46 is thus also supported in a predetermined relationship relative to the first end 70 of the strap member 60. In the example strap assembly 40, the ring member 46 is supported adjacent to the first buckle member 52.

A second end 76 of the strap member 50 is inserted through the first adjustment opening 64, through the second adjustment opening 66, through the second buckle opening 62, again through the first adjustment opening 64, and again through the second adjustment opening 66. The second end 76 is then sewn to a third intermediate location 78 along the strap member 50. The adjustment member 56 is thus supported in a predetermined relationship relative to the second end 76 of the strap member 50. However, a relationship between the second buckle member 54 and the second end 76 of the strap member 50 may be altered by sliding the adjustment member 56 relative to the strap member 50. The relationship between the strap member 50, second buckle member 54, and adjustment member 56 allows an effective length of the strap assembly 40 to be adjusted to fit the dimensions of the neck 24 of the dog 22.

The example pouch member 48 is attached to a fourth intermediate location 80 along the strap member 50. In the example strap assembly 40, the fourth intermediate location 80 overlaps the first intermediate location 72 and extends along the strap member 50 away from the first end 70 along a predetermined length L of the strap member 50. The example pouch member 48 is formed by a substantially rectangular sheet of fabric. In particular, the fabric sheet is folded and first and second opposing edges thereof are secured to the strap member 50 to form a flexible, generally cylindrical body 82 that extends along the fourth intermediate location 80 of the strap member 50. Additionally, a third edge of the fabric sheet adjacent to the first and second opposing edges is sewn to itself and to the first location of the strap member 70. The body 82 forming the pouch member 48 thus defines a pouch cavity 84 having an open end 86 and a closed end 88, with the closed end adjacent to the first buckle member 52 and the ring member 46.

As also perhaps best shown in FIGS. 4-5, the example retractable leash assembly 32 comprises a leash assembly 120 and a retraction assembly 122. The example leash assembly 120 comprises a cord member 130, a handle member 132, and a stop member 134.

The example cord member 130 is a length of material defining a proximal end 140 and a distal end 142. The material defining the cord member 130 should be capable of bearing tension loads when leading or otherwise restraining the particular dog 22 using the restraint system 20. The cord member 130 should also be of physical dimensions suitable for engaging the retraction assembly 122 as will be described in further detail below. The cord member 30 may be made of nylon, steel cable, or other material suitable for the purposes described herein.

The example handle member 132 is a loop of flexible material sewn to itself to define a handle loop 150 and a connecting loop 152. In the example leash assembly 32, the distal end 142 of the cord member 130 is inserted through the connecting loop 152 to connect the handle member 132 to the cord member 130. The handle loop 150 defines a tip portion 154.

The stop member 134 is a block of material secured to the distal end 142 of the cord member 130 adjacent to the handle member 132. The stop member 134 is sized and dimensioned and made of a material suitable for engaging the retraction assembly 122 as will be described in further detail below. The stop member 134 may also engage the cord member 130 and/or handle member 132 to form or strengthen the connection between the cord member 130 and the handle member 132.

The example retraction assembly 122 comprises a housing member 156, a spool member 158, a retraction member 160, and an anchor post 162. The housing member 156 is rigidly secured to the strap member 50 within the pouch cavity 84 adjacent to the closed end 88 thereof. The example housing member 156 may be made of a sturdy plastic material such as polyethylene terephthalate or of a fabric material such as Cordura.

The housing member 156 further defines a cord chamber 164 and a cord opening 166. The example spool member 158 defines a drum portion 170 and first and second flange portions 172 and 174. The spool member 158 is supported for rotation about an axis A within the cord chamber 164. The anchor post 162 is arranged substantially along the axis A. The example retraction member 160 is a spiral torsion spring secured at one end to the anchor post 162 and at another end to the drum portion 170 of the spool member 158. The example retraction member 160 is arranged within the drum portion 170 and around the anchor post 162.

The proximal end 140 of the cord member 130 is arranged within the cord chamber 164 and is secured to the spool member 158. When the leash assembly 32 is in the retracted configuration as shown in FIGS. 2, 3, and 5, almost the entire length of the cord member 130 is wrapped around the drum portion 170 of the spool member 158 and the retraction member 160 is slightly tensioned to maintain the cord member 130 within the cord chamber 164. When the handle member 132 is pulled, the cord member 130 unwinds from the spool member 158 such that almost the entire length of the cord member 130 is outside of the cord chamber 164; at this point, the leash assembly 32 is in the extended configuration shown in FIGS. 1 and 4.

When the leash assembly 32 is in the extended configuration, the tension on the retraction member 160 is increased. Accordingly, releasing pressure on the handle member 132 allows the retraction member 160 to rotate the spool member 158 and thereby wind the cord member 130 back onto the spool member 158. The side flanges 172 and 174 of the spool member 158 direct the cord member 130 onto the drum portion 170 thereof as the cord member 130 is wound back onto the spool member 158.

To prevent the retraction member 160 from constantly shortening the length of the cord member 130 outside of the housing 156, a locking system may be provided. The locking system may be a buckle engagement clip, a catch and release toggle, or a spring-loaded release toggle. The example retraction assembly 122 comprises a release toggle capable of remaining in at least first and second positions. In the first position, the toggle is flush with the end of the lock and the cord member 130 cannot move. In the first position, the toggle is not flush with the end of the lock, allowing the cord member 130 to move.

The stop member 134 engages the housing member 156 when the cord member 130 is fully retracted. The retraction member 160 can retract the cord member 130 fairly quickly, and the stop member 134 is typically rigid or can be made of a flexible material that can absorb shocks that would otherwise be transmitted to the juncture of the cord member 130 and the handle member 132.

FIGS. 3 and 5 further show that, when the leash assembly 32 is in the retracted configuration, the handle member 132 is substantially arranged within the pouch cavity 84. In the example leash assembly 32, the tip portion 154 of the handle member 132 extends outside the pouch cavity 84 to facilitate gripping of the handle member 132 to place the leash assembly 32 back into the extended configuration. Alternatively, the entire handle member 132 may be configured to be within the pouch cavity 84 when the leash assembly 32 is in the retracted configuration, in which case the pouch member 48 may be provided with a seam to facilitate access to the pouch cavity 84 and thus the handle member 132 when required. If such a seam is provided, a fastening system such as a zipper or hook and loop fastener may be provided to hold the seam closed when access to the pouch cavity 84 is not required.

Referring now to FIG. 6 of the drawing, depicted therein is a second example restraint assembly 220 constructed in accordance with, and embodying, the principles of the present invention.

Like the first example restraint assembly 20, second example restraint assembly 220 comprises a collar assembly 230 and a leash assembly 232. The second example leash assembly 232 is or may be the same as the first example leash assembly 32 described above and is similarly reconfigurable between retracted and extended configurations.

The example restraint assembly 220 is intended for use with pets where use of a collar system like the collar assembly 30 is not appropriate. For example, the second example collar assembly 230 may be sized and dimensioned to be detachably attached around the neck and chest of a smaller animal such as a cat in a conventional manner. Alternatively, the second example collar assembly 230 may be sized and dimensioned for larger or difficult to control animals that require straps around both the neck and the chest.

Referring now to FIG. 7 of the drawing, depicted therein is a third example restraint assembly 320 constructed in accordance with, and embodying, the principles of the present invention.

Like the first example restraint assembly 20, second example restraint assembly 320 comprises a collar assembly 330 and a retractable leash assembly 332. The second example retractable leash assembly 332 is or may be the same as the first example retractable leash assembly 32 described above and is similarly reconfigurable between retracted and extended configurations.

Like the collar member 30 described above, the collar assembly 330 comprises a strap assembly 340, a ring member (not shown), and a pouch member 342. The retractable leash assembly 332 comprises a leash assembly 350 having a handle portion 352 and a retraction assembly 354 having a housing 356.

The example pouch member 342 has a length dimension L and a nominal width dimension $w_N$. The pouch member 342 has a restriction width dimension $w_R$. The restriction width dimension $w_R$ is smaller than the nominal width dimension $w_N$ so that an interior chamber 360 defined by the pouch member 342 has an inlet portion 360a, an intermediate portion 360b, and a storage portion 360c.

The storage portion 360c is sized and dimensioned to receive the housing 356 of the retraction assembly 354, while the handle portion 352 of the leash assembly 350 is slightly longer than the total lengths of the inlet portion 360a and intermediate portion 360b of the pouch chamber 360. In addition, the inlet portion 360a and intermediate portion 360b are sized and dimensioned to receive the handle portion 352 of the leash assembly 350, but the intermediate portion 360b of the pouch chamber 360 is too small to allow the housing 356 of the retraction assembly 354 to pass from the storage portion 360c to the inlet portion 360b.

Accordingly, the narrowed intermediate portion 360b of the pouch chamber 360 secures the housing 356 within the storage portion 360c of the pouch chamber 360. The shape of the pouch member 342 thus can obviate the need to provide an additional fastener for connecting the housing 356 to the collar assembly 330. In this embodiment, the housing 356 will be arranged to be within the storage portion 360c when the pouch member 342 is formed.

The present invention may be embodied in forms other than those described above. The scope of the present invention should thus be determined by the claims appended hereto and not the foregoing detailed discussion of several examples of the embodiments of the present invention.

What is claimed is:

1. A restraint system for an animal comprising:
    a collar assembly comprising
        a strap member adapted to be secured around a portion of the animal, and
        a pouch member defining a pouch chamber having a closed end and an open end, where the pouch member is attached to the strap member at the closed end; and
    a retractable leash assembly comprising
        a retraction assembly secured to the strap member within the pouch chamber adjacent to the closed end of the pouch chamber,
        a cord member operatively connected to the retraction assembly, and
        a handle member operatively connected to the cord member; whereby
    the retractable leash assembly is operable in a retracted configuration in which the cord member is taken up by the retraction assembly, a first portion of the handle member is within the pouch chamber, and a second portion of the handle member is outside of the pouch chamber; and the retractable leash assembly is operable in an extended configuration in which at least a portion of the cord member is not taken up by the retraction assembly such that the entire handle member is outside of the pouch chamber.

2. A restraint system as recited in claim 1, in which an effective length of the collar assembly is adjustable.

3. A restraint system as recited in claim 1, in which the strap member is nylon.

4. A restraint system as recited in claim 1, in which the cord member is withdrawn from the retraction assembly by application of manual force on the handle member.

5. A restraint system as recited in claim 1, in which the retraction assembly comprises a spring configured to bias the leash assembly in the retracted configuration.

6. The leash assembly of claim 1, further comprising a locking mechanism for releaseably locking the leash in the extended configuration.

7. A method of restraining an animal comprising:
providing a strap member adapted to be secured around a portion of the animal;
securing a pouch member to the strap member to form a collar assembly, where the pouch member defines a pouch chamber having a closed end and an open end, and the pouch member is attached to the strap member at the closed end;
securing a retraction assembly to the strap member within the pouch chamber adjacent to the closed end of the pouch chamber;
operatively connecting a cord member to the retraction assembly;
operatively connecting a handle member to the cord member;
retracting the cord member into the retraction assembly such that
the cord member is taken up by the retraction assembly,
a first portion of the handle member is within the pouch chamber, and
a second portion of the handle member is outside the pouch chamber; and
pulling the cord member from the retraction assembly such that at least a portion of the cord member is not taken up by the retraction assembly and the entire handle member is outside of the pouch chamber.

8. A method as recited in claim 7, further comprising the step of securing the collar assembly around a portion of a pet.

9. A method as recited in claim 7, further comprising the step of adjusting an effective length of the collar assembly.

10. A method as recited in claim 7, further comprising the step of applying manual force to the handle member to withdraw the cord member from the retraction assembly.

11. A method as recited in claim 7, further comprising the step of arranging a spring within the retraction assembly to retract the cord member into the retraction assembly.

12. The leash assembly of claim 7, further comprising the step of releaseably locking the leash in the extended configuration.

13. A restraint system for an animal comprising:
a collar assembly comprising
a strap member adapted to be secured around a portion of the animal,
a first buckle member secured relative to a first end of the strap member,
an adjustment member secured relative to a second end of the strap member,
a second buckle member supported by the strap member adjacent to the adjustment member, and
a pouch member secured to the strap member, the pouch member defining a pouch chamber having a closed end and an open end, where the pouch member is attached to the strap member at the dosed end; and
a retractable leash assembly comprising
a retraction housing secured to the strap member within the pouch chamber,
a retraction member arranged within the housing adjacent to the dosed end of the pouch chamber,
a cord member operatively connected to the retraction member, and
a handle member operatively connected to the cord member; whereby the retractable leash assembly is operable in a retracted configuration in which
the cord member is taken up by the retraction assembly,
a first portion of the handle member is within the pouch chamber, and
a second portion of the handle member is outside of the pouch chamber; and
the retractable leash assembly is operable in an extended configuration in which at least a portion of the cord member is not taken up by the retraction assembly such that the entire handle member is outside of the pouch chamber.

14. A restraint system as recited in claim 13, in which the strap member is nylon.

15. A restraint system as recited in claim 13, in which the cord member is withdrawn from the retraction assembly by application of manual force on the handle member.

16. A restraint system as recited in claim 13, in which the retraction member is a spring configured to bias the leash assembly into the retracted configuration.

17. The restraint system of claim 13, further comprising a locking mechanism for releaseably locking the leash in the extended configuration.

* * * * *